No. 840,003. PATENTED JAN. 1, 1907.
H. W. LINEWEAVER.
FEEDING TROUGH.
APPLICATION FILED MAR. 12, 1906.

Witnesses
A. G. Hague.
S. F. Christy.

Inventor H. W. Lineweaver
by Orwig & Lane Att'ys

UNITED STATES PATENT OFFICE.

HENRY W. LINEWEAVER, OF SOUTH ENGLISH, IOWA.

FEEDING-TROUGH.

No. 840,003.　　　Specification of Letters Patent.　　　Patented Jan. 1, 1907.

Application filed March 12, 1906. Serial No. 305,610.

*To all whom it may concern:*

Be it known that I, HENRY W. LINEWEAVER, a citizen of the United States, residing at South English, in the county of Keokuk and State of Iowa, have invented a certain new and useful Feeding-Trough, of which the following is a specification.

The object of my invention is to provide an animal-feeding trough of simple, durable, and inexpensive construction in which the animals feeding in one compartment of the trough may be given a greater or less quantity of feed from the hopper, so that the weaker animals will not be deprived of food or crowded out of their compartments, so that the operator may, if desired, give a larger proportion of feed to some of the animals than to others feeding from the same trough.

My invention consists in the construction of the trough, whereby the objects contemplated are attained, as hereinafter more fully set forth, pointed out in my claims, and illustrated in the accompanying drawings, in which—

Figure 1:
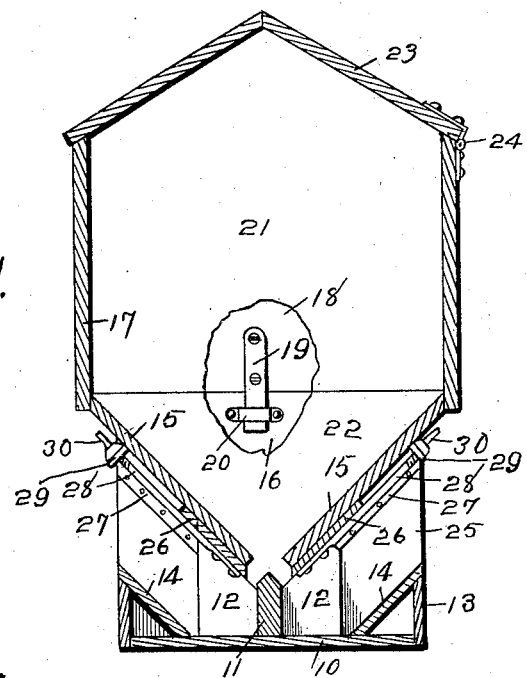
Figure 2:
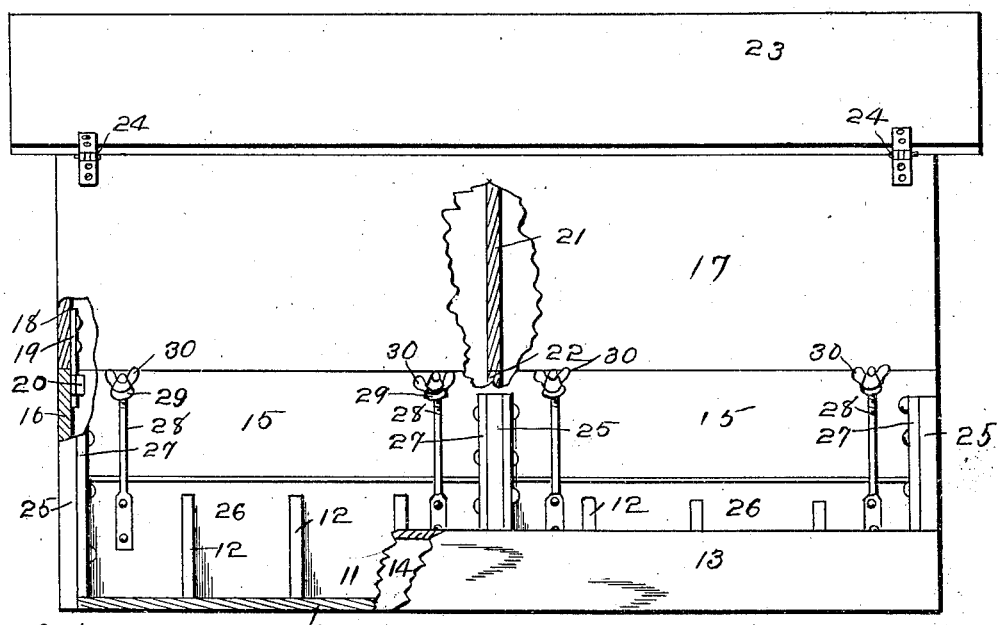

Figure 1 shows a vertical transverse sectional view through the trough, and Fig. 2 shows a side elevation of same with part of the trough side broken away.

Referring to the accompanying drawings, I have used the reference-numeral 10 to indicate the base of the trough. Arranged at the center of the base is a longitudinal dividing-board 11. Extended laterally from the dividing-board 11 is a number of short partitions 12, which may be secured in position by fastening them to the dividing-board and to the bottom 10. In this way the dividing-board and partitions serve to mutually brace each other and form a strong and inexpensive structure. At the edge of the base-board are the trough sides 13, and extending from the tops of the sides 13 downwardly and inwardly are the guide-boards 14. The sides of the bottom of the hopper are indicated by the numeral 15 and are inclined downwardly and inwardly toward the dividing-board 11, their lower edges being spaced apart from the top of said dividing-board and their upper edges arranged vertically.

At the ends of the trough are the end pieces 16, with their tops flush with the tops of the parts 15. The hopper-body portion comprises the sides 17, which are designed to fit against the upper edges of the parts 15 and in this way be prevented from lateral movement relative to the parts 15. The hopper ends 18 rest flat against the tops of the parts 16, and I have provided for preventing their longitudinal movement by means of the bar 19, fixed to the part 18 and passed through a loop 20 on the part 16. At the center of the hopper-body is a vertical partition 21 and below it a partition 22 of the same size as the end pieces 16. The top 23 of the hopper is hinged at one side by the hinges 24. When the hopper top portion is in position, it is held against movement in all directions and yet it may readily be removed bodily without releasing any fastening devices, and when it is removed food may be placed in it and the animals may feed from the trough in the same manner as before described.

At the center of each side of the trough are the upright supports 25, engaging the bottom of the hopper. Mounted beneath the bottom 15 of each side of the trough are two slides 26, each of which extends from the central support 25 to one of the ends of the trough, and each is slidingly supported in the guides 27 with its inner edge resting on top of the partitions 12. I have provided for adjusting these slides by means of rods 28, fixed to them and passed through the screw-eye 29 on the bottom 15. Each rod is provided with an adjusting-nut 30 to engage the screw-eye. In this way I make each of the slides independently adjustable.

In practical operation and assuming the hopper contains food that may discharge through the opening at the bottom and assuming, further, that all of the slides are open slightly, so that each of the feeding-compartments contains food, then the animals feeding from the trough will be prevented by the guards 14 from placing their front feet in the trough, because if they do so their feet will slide downwardly toward the center of the trough and prevent them from feeding on the trough. If, however, the animals stand with their feet on the outside of the trough, they can readily reach the food lying adjacent to the central division-board. Furthermore, the guards 14 prevent the accumulation of food at the outer edge of the trough, where the animals could not readily reach it. So long as the animals feeding from one compartment can obtain any food at all they will remain in position and will not move to the other compartments. The partitions 12 prevent them from seeing the food in the other compartments, and all they can see is contained in the compartment from which they are feeding. Therefore if the operator desires to give some of the animals more food than others he can do so by simply adjusting the slide of the desired compartment, so that the food enters the trough in said compartment in greater quantities than in the other compartments. This may be done when the animals are feeding and the weaker animals, or those to be fattened, will not be molested by the others. Furthermore, the trough is made very strong and durable by having the central division-board and the transverse partitions arranged to mutually support and brace each other, and in this way an inexpensive trough is provided that has great strength and durability.

If it is desired to provide the trough with large quantities of feed, so that the animals may obtain food when desired without the attention of the operator, then the hopper is left in position as shown, or if it is desired to feed the animals in limited quantities the hopper may be removed and the food placed in the hopper-top, as desired.

Having thus described my invention, what I claim, and desire to secure by Letters Patent of the United States therefor, is—

1. A feeding-trough comprising a bottom, trough sides, an upright longitudinal division-board, transverse partitions engaging the division-board and the bottom, a hopper with an opening adjacent to the division-board and a number of slides capable of independent adjustment arranged beneath the hopper to control the flow of feed from the hopper to the trough.

2. In a feeding-trough, the combination of a base, trough sides secured to the base, guards at the top of the sides inclined downwardly toward the base, a longitudinal central division-board, a number of transverse partitions fixed to the base and to the sides of the central division-board, upright end pieces and a central support, a hopper on said end pieces and central support having the sides of its bottom inclined downwardly and inwardly to a point a short distance from the central division-board, guides on the central division-board and ends, a number of slides supported in said guides resting upon the transverse partitions, rods fixed to the slides, loops secured to the hopper-bottom having said rods passed through them and nuts on said rods for adjusting the slides.

3. A feeding-trough comprising a bottom, trough sides, an upright longitudinal divisional board, transverse partitions engaging the division-board and the bottom, hopper sides inclined downwardly with their lower edges spaced apart from the longitudinal divisional board, a number of slides capable of independent adjustment beneath the hopper-bottom to control the flow of feed through the openings between the bottom pieces and division-board, a central partition extending across the hopper-bottom, a hopper-top comprising ends to rest upon the ends of the trough, a central partition to rest upon the said partition-piece, hopper sides to project downwardly beyond the edges of the hopper-bottom pieces, a hinged cover, bars fixed to the hopper ends and loops fixed to the ends of the trough to receive said bars.

HENRY W. LINEWEAVER.

Witnesses:
A. T. PARKE,
W. W. WHITE.